United States Patent [19]

Krüger et al.

[11] Patent Number: 4,629,013
[45] Date of Patent: Dec. 16, 1986

[54] DRIVE DEVICE FOR A DRILL BIT

[75] Inventors: Volker Krüger, Celle; Heinrich Daenicke, Wienhausen, both of Fed. Rep. of Germany

[73] Assignee: Norton Christensen, Inc., Salt Lake City, Utah

[21] Appl. No.: 742,686

[22] Filed: Jun. 10, 1985

[30] Foreign Application Priority Data

Apr. 12, 1985 [DE] Fed. Rep. of Germany ....... 3513124

[51] Int. Cl.⁴ .......................... E21B 4/02; F16C 17/04
[52] U.S. Cl. .................................... 175/107; 175/320; 384/308
[58] Field of Search ................. 175/107, 320; 384/306, 384/308, 307

[56] References Cited

U.S. PATENT DOCUMENTS

| | | | |
|---|---|---|---|
| 1,991,461 | 2/1935 | Howarth | 384/306 |
| 2,874,007 | 2/1959 | Cametti et al. | 384/308 |
| 2,890,916 | 6/1959 | Maynard | 384/308 |
| 3,858,668 | 1/1975 | Bell | 175/107 |
| 3,930,691 | 1/1976 | Greene | 384/307 |
| 4,453,604 | 6/1984 | Ioanesian et al. | 175/107 |

FOREIGN PATENT DOCUMENTS 882326 11/1961 United Kingdom ................ 175/107

Primary Examiner—Stephen J. Novosad
Assistant Examiner—Bruce M. Kisliuk
Attorney, Agent, or Firm—Walter Fred

[57] ABSTRACT

A drive device for driving a drill bit for drilling bore holes in underground formations comprises a tubular housing for attachment to a drill string with a rotary drive means in the housing arranged to be driven by fluid forced through the housing. The rotary drive means drives an output shaft for connecting to a drill bit, the output shaft being supported by at least one axial bearing which comprises a continuous bearing ring and a retaining ring carrying a plurality of bearing segments which are swivellingly mounted to provide for a spacing of reducing cross-section between the bearing surfaces so that relative rotation of the bearing ring and bearing segments causes fluid to flow into the space and build up a hydrodynamic lubricating film.

12 Claims, 7 Drawing Figures

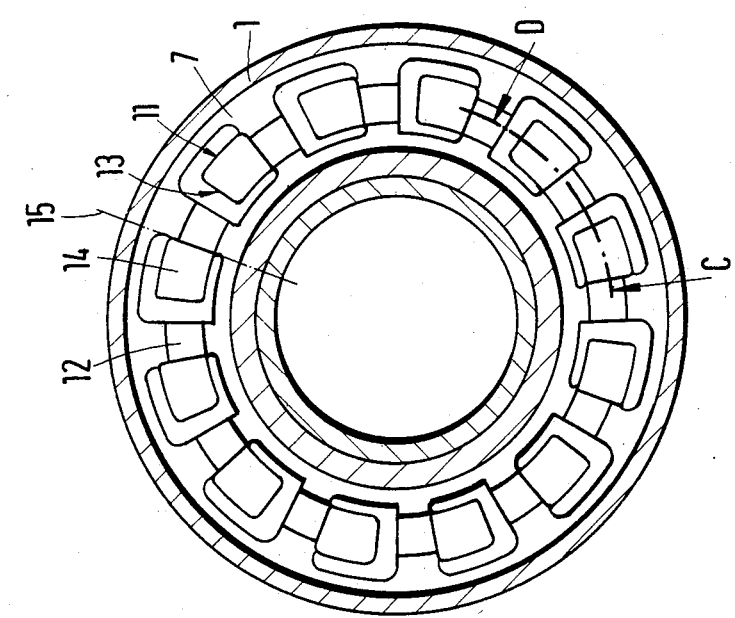
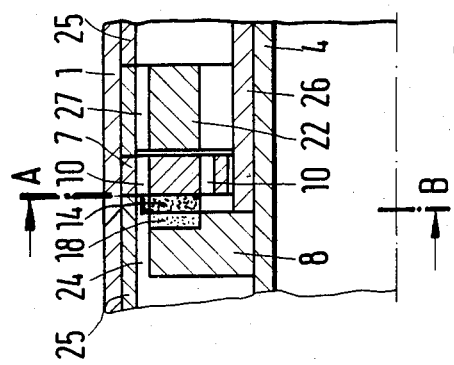
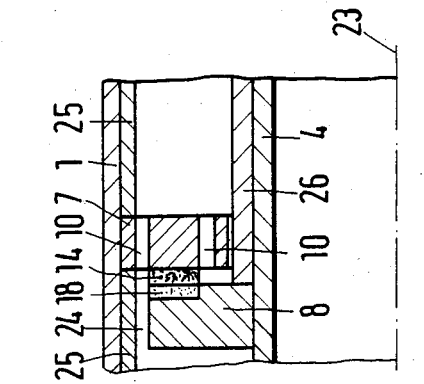
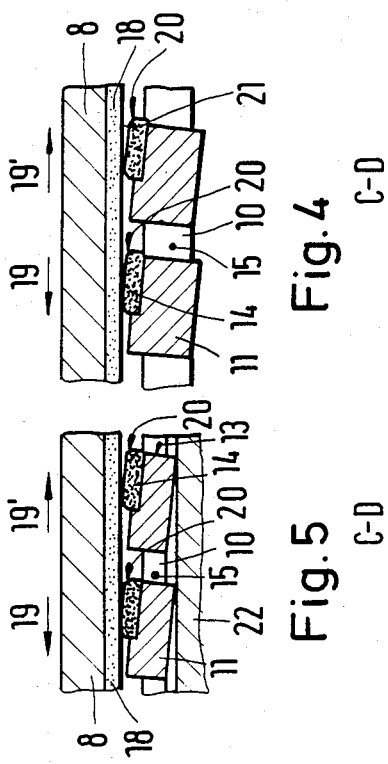
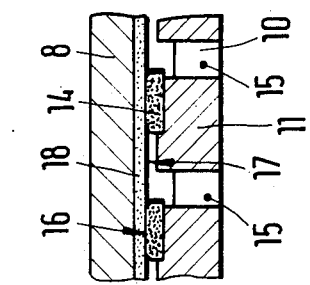

DRIVE DEVICE FOR A DRILL BIT

BACKGROUND OF THE INVENTION

1. Field of the Invention

This invention relates to a drive device for driving a drill bit for drilling bore holes in underground formations.

2. Description of Prior Art

It is conventional to drive a drill bit by means of a rotary drive means disposed within a housing, the drill bit being attached to an output shaft driven by the rotary drive means. The housing is arranged to be connected to a drill string. The rotary drive means may be of the type which is powered by a working fluid, such as a working oil, which is forced through the housing under pressure, for example a turbine or Moineau-type motor.

The output shaft of such a drive means is subjected to axial forces in two opposite directions. Firstly, the pressure drop in the working fluid across the drive means generates a force in a downward direction and secondly, the reaction force of the drill bit in contact with the bore-hole bottom generates a force in an upward direction.

Ideally, these two forces are balanced but inevitably resultant axial forces will be generated when the forces are out of balance. Such conditions occur, for example, when factors other than balancing of axial forces are of prime consideration, for example a high drilling rate. Thus such devices require axial thrust bearings to absorb differences in axial forces over prolonged periods of operation.

German Patent Specification No. 2,250,415 discloses an axial bearing for a drilling turbine of the type described above in which a retaining ring carries a continuous bearing ring made of hardened steel and another retaining ring is provided with steel elements which are carried on elastomer supports located in blind holes disposed parallel to the axis of the shaft. The bearing ring and the steel elements have bearing surfaces which are in bearing contact with one another. The purpose of this arrangement is to dampen vibrations between the bearing surfaces and, in the case of a multi-stage design of bearing, to distribute the load between the individual stages. By arranging the steel elements in blind holes, an axial guidance is achieved which ensures that the bearing surfaces of the steel elements are constantly in full-area contact with the bearing surface of the bearing ring.

Such a bearing, however, involves direct metal to metal contact between the bearing surfaces of the steel elements and the bearing ring with the attendant problems as high wear rate.

An object of the present invention is to provide an improved axial bearing for use in a drive device for driving a drilling bit. A further object is to provide an axial bearing having improved wear characteristics.

SUMMARY OF THE INVENTION

According to the present invention we provide a drive device for driving a drill bit for drilling bore holes in underground formations comprising:
- a tubular housing having first and second ends;
- a rotary drive means disposed within said tubular housing;
- an output shaft arranged to be driven by said rotary drive means and extending from said second end of said housing;
- means for connecting said output shaft to a drill bit;
- means for connecting said first end of said tubular housing to a drill string;
- said rotary drive means being arranged to be driven by fluid forced through said housing;
- an axial bearing mounted on said housing for rotatably supporting said output shaft;
- said axial bearing comprising a continuous bearing ring having a bearing surface and a retaining ring carrying a plurality of bearing segments having bearing surfaces for bearing contact with the bearing surface of said bearing ring;
- each bearing segment being swivellingly mounted on the retaining ring to provide for a space of reducing cross-section between the bearing surfaces of said bearing segments and of said bearing ring;
- whereby relative rotation between the bearing segments and the bearing ring causes fluid to flow into the space between the bearing surfaces thereof to build up a hydrodynamic lubricating film.

The swivelling ability of the bearing segments relative to the retaining ring provides a space between the bearing surfaces of the bearing segments and of the bearing ring which reduces in cross-section so that as the bearing segments rotate relative to the bearing ring the working fluid is subjected to a progressively increasing pressure in the space in the direction of the constriction to form a hydrodynamic lubricating film and subsequently to a drop to ambient pressure again as the working fluid escapes. The absolute gauge pressure within the space depends on the speed.

As a consequence, the pure sliding friction between the bearing surfaces on the bearing segments and of the bearing ring at low speeds becomes a so-called "mixed" friction at speeds in the medium range, which results in a partial separation of the loaded bearing surfaces, and thus to a reduction in wear. At speeds in the higher range, the pressure build-up in the lubricating film may by sufficient to induce floating of the bearing surfaces on the lubricating film, thereby avoiding their direct contact and reducing wear to a minimum. In the stationary state a resulting bearing force is adopted on each bearing segment so as to retain its angled position relative to the bearing ring to provide a space of reducing cross-section.

The constant replacement of the lubricating film by fresh working fluid entering the space also results in good cooling of the bearing surfaces.

Preferably the bearing segments have leading surfaces in the direction of rotation of the segments relative to the bearing ring and said leading surfaces are chamfered.

The bearing segments are preferably pivoted about an axis extending radially of the housing. In one embodiment the pivot axis is disposed substantially centrally of their dimension in a circumferential direction. In another embodiment the pivot axis is disposed off-centre of their dimension in a circumferential direction.

In one particularly preferred form of bearing a plurality of resilient arms are provided, each of said arms having a fixed end secured to the retaining ring and a free end carrying a bearing segment. Advantageously, each resilient arm is formed integral with said retaining ring with a U-shaped apertured region surrounding each arm, said apertured regions providing for axial flow of fluid through the bearing.

The bearing surfaces of the bearing ring and/or the bearing segments may be made of a hard wear-resistant material applied directly thereto or applied via an intermediate substrate. The hard wear-resistant material may be, for example, a ceramic material, sintered metal powder, tungsten carbide or polycrystalline diamond. All the bearing surfaces may be made from the same material or different materials may be employed for different bearing surfaces.

It is desirable to provide limit means to limit the bending of the resilient arms. Such limit means may comprise a stop ring spaced from the retaining ring at a distance to provide a predetermined maximum bending of the resilient arms.

BRIEF DESCRIPTION OF THE DRAWINGS

Reference is now made to the accompanying drawings, in which:

FIG. 2 is a cross-section in the plane A-B of FIG. 1;

FIG. 3 is a longitudinal section along the circumferential surface C-D of FIG. 2;

FIG. 4 is a longitudinal section similar to FIG. 3 showing the bearing in operation;

FIG. 5 is a longitudinal section similar to FIG. 4, showing a modified embodiment;

FIG. 6 is a part longitudinal section in a plane extending along the bearing axis; and FIG. 7 is a part longitudinal section in a plane extending along the bearing axis of a modified embodiment.

Figure 1:
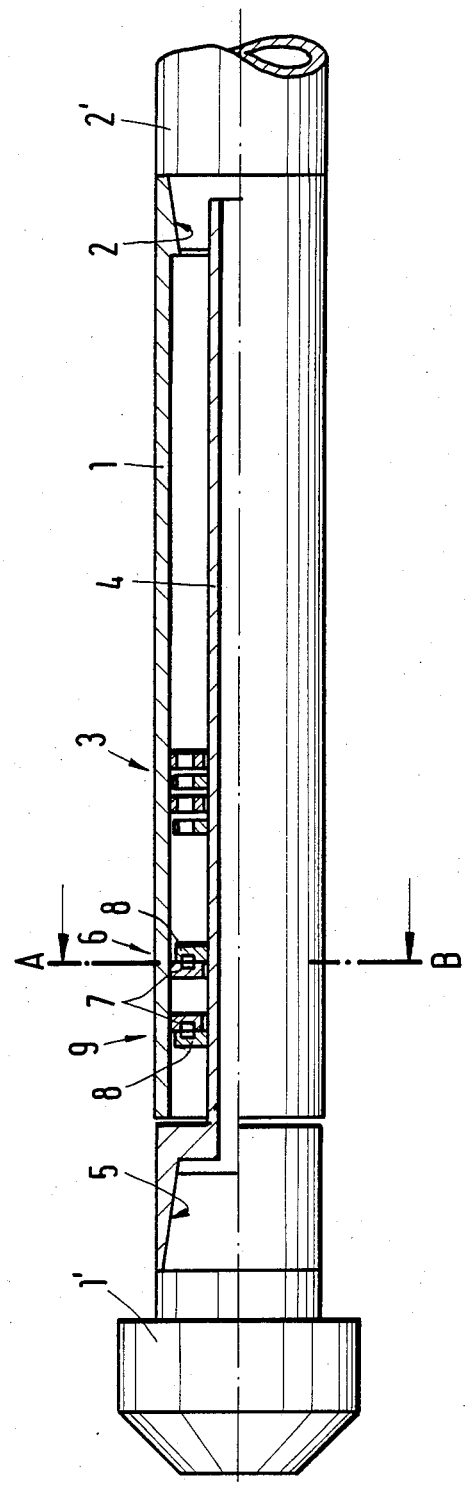
FIG. 1 is a schematic longitudinal section through a direct drive device according to the invention.

The direct drill bit drive device illustrated in FIG. 1 comprises a tubular housing 1 which can be connected to a drill string 2' by means of a thread 2. Arranged inside the housing 1 is a rotary drive means which can be powered by pressurised working oil flowing through it and takes the form of a turbine 3, the output shaft 4 of which emerges axially from the housing 1 at the bottom and has a thread 5 for connecting to a rotary drill bit 1'.

A first axial bearing 6 comprising a continuous bearing support ring 8 carried by the shaft 4 and a retaining ring 7 carried by the housing 1 is provided to accommodate axial forces directed towards the bottom of the bore hole. To accommodate forces in the opposite direction, a further axial bearing 9 having a reverse arrangement of the retaining ring 7 and bearing ring support 8 is also provided.

The structure of the retaining ring 7 supported in the housing 1 can be seen from the section through the axial bearing 6 illustrated in FIG. 2. This retaining ring has axially extending orifices 10 of approximately U-shaped or trapezoid cross-section distributed around its circumference. In the case of U-shaped cross-section orifices, a resilient arm 11 is formed integrally with the retaining ring 7. In the case of the trapezoid cross-section orifices, a separate resilient arm 11 is connected to the web 12 remaining between two neighbouring orifices 10 in such a way that its free end 13 protrudes into the orifice 10. Each resilient arm 11 carries a bearing segment 14 made of a hard, wear-resistant material, e.g. of a sintered metal powder, ceramic material or polycrystalline diamond, which in plan view is similar to the approximately trapezoidal cross-section of the orifice 10, but of reduced size.

The bearing segments 14 are carried by its resilient arms 11 by a swivel mounting about a swivel axis 15 extending in a radial direction and arranged off-centre in a circumferential direction and lying in the region of the transition of the resilient arm 11 and the web 12.

As can be seen from the longitudinal section through the retaining ring 7 along the circumferential surface C-D, illustrated in FIG. 3, the bearing segments 14 are aligned parallel to the plane of the retaining ring 7 in the unloaded state and with the shaft 4 stationary. The bearing surfaces 16 of the bearing segments 14 lie in full-area contact with the bearing surface 17 of a bearing ring 18 which is arranged on the bearing ring support 8. The bearing ring 18 preferably consists of a similar material to that of the bearing segments 14.

If the output shaft 4 and the bearing ring support 8 carried by the shaft 4 are rotated in the direction of the arrow 19, as illustrated in FIG. 4, the bearing ring 18 and its bearing surface 17 carries the working oil with it, due to surface effects, so that the working oil is forced between the bearing surfaces 16 of the bearing segments 14 and the bearing surface 17 of the bearing ring 18. This effect is enhanced by chamfers 20 on the bearing segments 14 and by the axial force of the bearing ring 18 on the bearing segments 14 which causes the resilient arms 11 to bend and the bearing segments to swivel about the axis 15. This forms spaces 21 which converge in the direction of rotation 19 of the bearing ring 18 relative to the bearing segments 14 and the pressure of the working oil increases, initially at a constant rate, so that a hydrodynamic lubricating film between the bearing surfaces 16 and 17 builds up. Towards the end of the space 21, the pressure is reduced again to ambient pressure as the working oil escapes. In the stationary state, the resulting force on the bearing segments 14 formed by the back pressure of the working oil in the space 21, acts to stabilise the swivel position of the bearing segments 14 about the swivel axis 15.

The resilient arms 11 in FIG. 4 are of relatively stable design, to enable them to withstand high axial forces without damage. The modified embodiment illustrated in FIG. 5 has resilient arms 11 of less stable design and to prevent excessive bending a stop ring 22 is attached at a distance to permit a maximum deflection of the arms. In the position shown, the edges of the free ends 13 of the resilient arms 11 are in contact with the stop ring 22.

FIGS. 6 and 7 show the embodiments of FIGS. 4 and 5, in part longitudinal section in a plane extending along the axis 23 of the bearing. In FIG. 6 the retaining ring 7 is clamped between assembly sleeves 25, which are braced between shoulders (not shown) of the housing 1. In FIG. 7, the stop ring 22 is additionally attached to the retaining ring 7 and clamped together with the ring between the assembly sleeves 25. The bearing ring support 8 with the bearing ring 18 is clamped between a shoulder of the shaft 4 and an assembly sleeve 26.

To enable the working oil to pass axially through the axial bearing, an annular space 24 is provided between the bearing ring support 8 and the assembly sleeves 25. The working oil can flow through the retaining ring 7 through the orifices 10 and corresponding apertures 27 arranged in the stop ring 22 which are preferably aligned with the orifices 10 to provide a continuous uninterrupted flow path.

We claim:

1. A drive device for driving a drill bit for drilling bore holes in underground formations comprising:
   a tubular housing having first and second ends;

a rotary drive means disposed within said tubular housing;

an output shaft arranged to be driven by said rotary drive means and extending from said second end of said housing;

means for connecting said output shaft to a drill bit;

means for connecting said first end of said tubular housing to a drill string;

said rotary drive means being arranged to be driven by fluid forced through said housing;

an axial bearing mounted on and between said housing and said output shaft for rotatably supporting said output shaft;

said axial bearing comprising a continuous bearing ring having a hard wear resistant bearing surface about the output shaft and a retaining ring connected to said housing and carrying a plurality of circumferentially spaced resilient arms and bearing segments having hard wear-resistant bearing surfaces for bearing contact with the bearing surface of said bearing ring;

each resilient arm having a fixed trailing end portion connected to the retaining ring, a free leading end portion integral with and projecting circumferentially from the fixed end portion and into an aperture extending axially through the retaining ring between adjacent resilient arms and which supports a bearing segment thereon;

each resilient arm and bearing segment thereon being swivellingly mounted on the retaining ring and pivotable about a radial axis to provide for a space of gradually reducing depth from leading surfaces of and between the bearing surfaces of said bearing segments and of said bearing ring which converge in the direction of and during rotation of the bearing ring;

whereby relative rotation between the bearing segments and the bearing ring causes fluid to flow into the space between the gradually reduced converging bearing surfaces thereof to build up a hydrodynamic lubricating film therebetween.

2. A drive device according to claim 1 in which the bearing segments have chamfered leading surfaces in the direction of rotation of the bearing ring.

3. A drive device according to claim 1 in which each of the resilient arms and bearing segments thereon are pivoted about a radial axis extending radially of the housing and the retaining ring and disposed substantially centrally of the length of the resilient arm in a circumferential direction.

4. A drive device according to claim 1 in which each of the resilient arms and bearing segments thereon are pivoted about an axis extending radially of the housing and the retaining ring and disposed off-center of the length of the resilient arm in a circumferential direction and substantially in a region of transition between the fixed end and free end portions of the resilient arm.

5. A drive device according to claim 1 in which each resilient arm is formed integral with said retaining ring and projects into a U-shaped apertured region about the free end of the resilient arm and thus providing for axial flow of fluid through the bearing.

6. A drive device according to claim 1 in which the bearing ring and the bearing segments are provided with bearing surfaces made of hard wear-resistant material applied directly thereto.

7. A drive device according to claim 6 in which the bearing ring and the bearing segments are provided with bearing surfaces made of hard wear-resistant material applied thereto via an intermediate substrate.

8. A drive device according to claim 7 in which the hard wear-resistant material of each bearing surface is selected from the group consisting of ceramic material, sintered metal powder, tungsten carbide and polycrystalline diamond.

9. A drive device according to claim 6 in which the hard wear-resistant material of each bearing surface is selected from the group consisting of ceramic material, sintered metal powder, tungsten carbide and polycrystalline diamond.

10. A drive device according to claim 1 in which limit means are provided to limit the bending of the resilient arms.

11. A drive device according to claim 10 in which the limit means comprises a stop ring spaced from said retaining ring at a distance to provide a predetermined maximum bending of the resilient arms.

12. A drive device according to claim 1 including at least one axial bearing for each axial load direction of the output shaft.

* * * * *